Sept. 28, 1926.

W. J. POOLE ET AL 1,601,144

AUTOMATIC TIRE INFLATOR

Filed Nov. 26, 1924    2 Sheets-Sheet 1

Inventors
William J. Poole
Grover Laube.

Attorney.

Sept. 28, 1926.  
W. J. POOLE ET AL  
1,601,144  
AUTOMATIC TIRE INFLATOR  
Filed Nov. 26, 1924   2 Sheets-Sheet 2

Inventors.  
William J. Poole.  
Grover Laube.

Attorney.

Patented Sept. 28, 1926.

1,601,144

UNITED STATES PATENT OFFICE.

WILLIAM J. POOLE AND GROVER LAUBE, OF LOS ANGELES, CALIFORNIA; SAID LAUBE ASSIGNOR TO SAID POOLE.

AUTOMATIC TIRE INFLATOR.

Application filed November 26, 1924. Serial No. 752,328.

This invention has to do with pumps for inflating pneumatic tires and the like by virtue of their deflection. The device embodying the invention is automatically controlled, that is, during advancing movement of an equipped vehicle, the device idles or rests when the tire pressure is at or above predetermined amount, and automatically starts to deliver air to the tire when the pressure drops below the predetermined amount, or, in certain situations when the load supported by the tire is increased sufficiently to cause abnormal tire deflection.

The utility of the invention will be apparent from the foregoing, for it will be seen that it automatically compensates for slow leaks in tire tubes and for valve leaks of a minor nature. In the absence of blow-outs, punctures, or almost complete deflation of the tire between periods of car operation, the device dispenses with the necessity of usual hand and power pumps. In addition to the feature of relieving the vehicle operator from the necessity of more or less frequently replenishing the tire air, the effect of the device is to prolong the useful life of tires, for a tire kept constantly inflated to the proper degree outlasts a tire which is only occasionally brought up to pressure.

Other features of novelty and objects of the invention may be discussed to better advantage in the following detailed description, reference being had to the accompanying drawings, in which.

Figure 1:
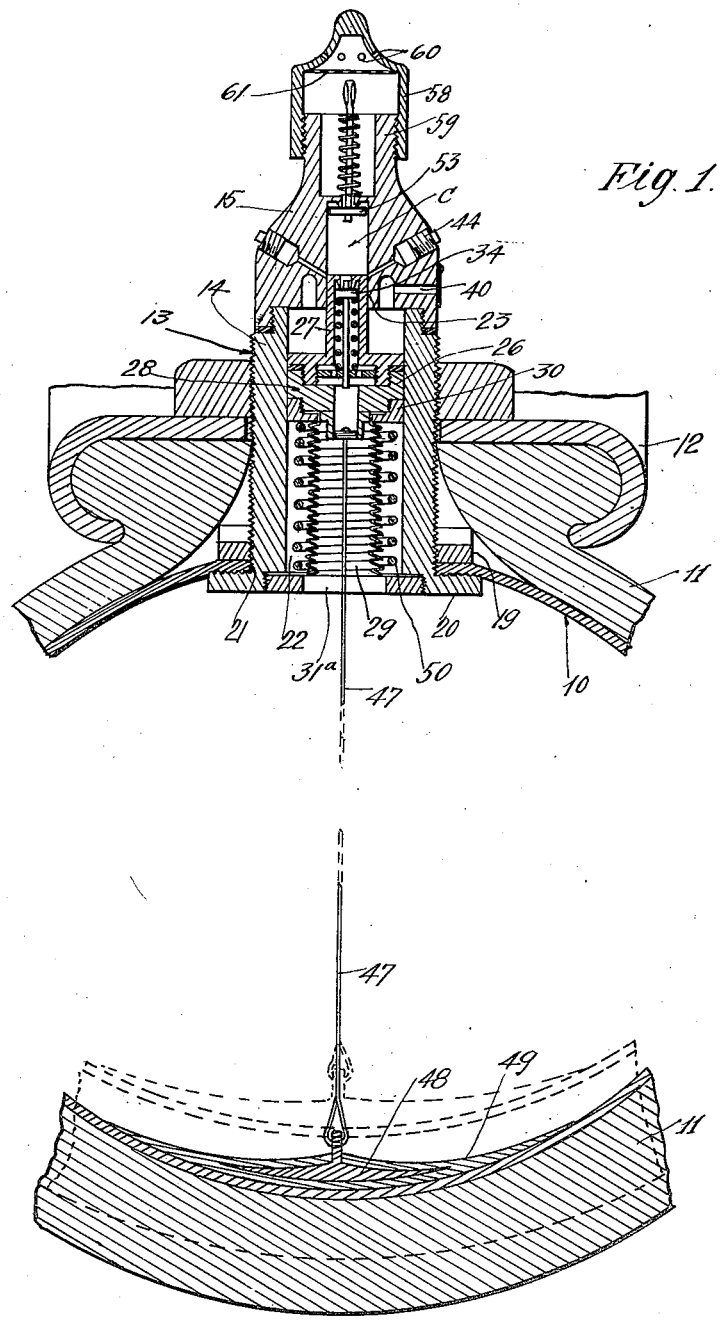
Fig. 1 is a broken-away transverse section through a tire equipped with one embodiment of the invention.

At the outset, it is desired to set forth that while a particular type of pump is shown and described as being associated with a tire in a particular manner, the invention, in its broader aspects, is in no way limited to the embodiment illustrated, and the following description of the illustrated and preferred embodiment of the invention is not to be construed as in any way limitative on said broader claims.

In the drawings, numeral 10 designates an inner tube within a usual tire shoe 11, the latter being held to rim 12 in any usual manner. A pump generally indicated at 13 is illustrated as being directly supported by tube 10, but in certain situations it may be desirable to mount the pump on the tire rim or vehicle wheel and connect its outlet to the inner tube by piping. Pump barrel 13ª is made up of tubular members 14 and 15 detachably joined by screw threads 17, a gasket or washer 18 preferably being interposed, as illustrated. Nut 19 is adapted to be threaded down on member 14 to clamp tube 10 between it and flange 20 at the end of said member, tube 10 being suitably apertured at 21 to allow the introduction of said flange to the interior of the tube.

The bores 22 and 23 of member 14 and 15, respectively, are coaxial but of differential diameters. The end of member 15 forms a shoulder 24 overhanging bore 22 and is adapted to limit the upward movement of plunger 26. Plunger 26 is of two diameters, the portion 27 (which we will term a "piston") being of relatively small diameter and adapted to reciprocate through bore 23, and the portion 28 being of relatively large diameter and adapted to reciprocate through bore 22. The lower end of the plunger is exposed to the air under pressure within tube 10 and since it is necessary that there be as little as possible escape of air from within tube 10 and further, since it is a matter of some difficulty to pack the pump so there be no escape of air around portion 26, it is preferred to provide a flexible tube 29 between inner tube 10 and the bottom of the plunger, it being comparatively easy to render this type of connection air tight. Tube 29 is clamped to plunger 26 by flanged collar 30 and to pump body 14 by nut 31ª, and is preferably preformed after the manner of a bellows.

The plunger is so proportioned that the effective surface area presented to the air within tube 10 is appreciably greater than that presented to the air within bore 23 above the piston.

Figure 2:
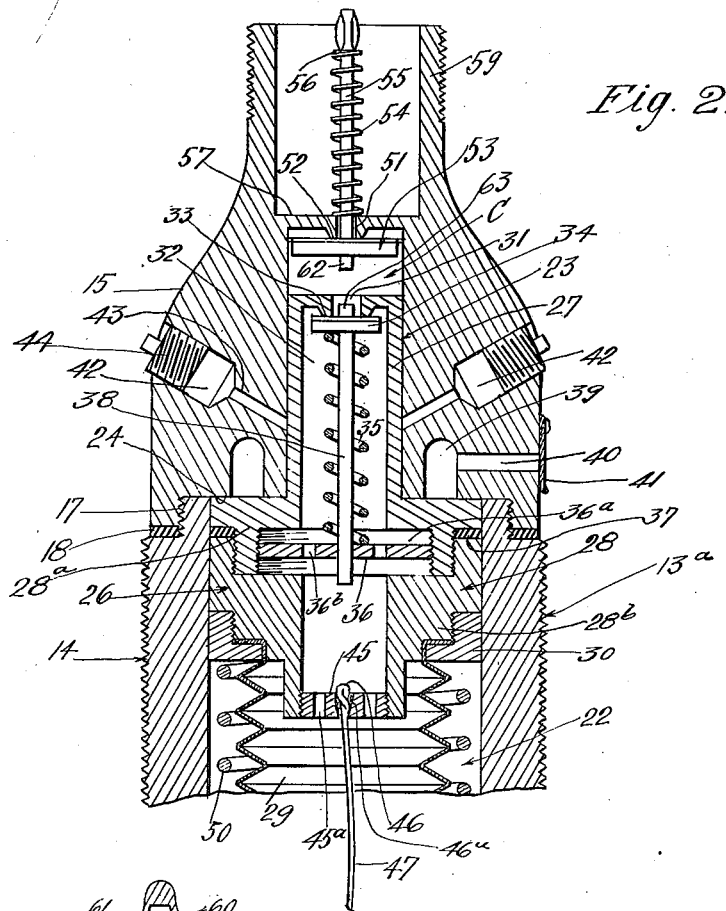
Fig. 2 is an enlarged view similar to a portion of Fig. 1 but showing certain of the parts in changed position.
Figure 3:
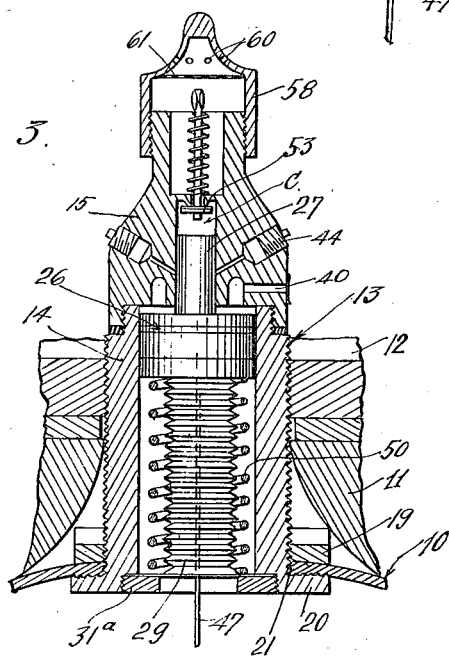
Fig. 3 is a view similar to a portion of Fig. 1 but showing the parts in different positions than they occupy in Figs. 1 and 2.

The relative lengths of bore 23 and piston 27 are such that when the piston is at the upper limit of its stroke (Fig. 2) as determined by shoulder 24, valve 53 (at the upper end of bore 23, as will be later described) and the top of piston 27 are spaced apart to provide a pressure chamber C.

The hereinafter described construction of the plunger is not essential, considering the invention in its broader aspects, but is a preferable one. The upper end of the piston has an inlet port 31 opening to piston bore 32 which communicates with tubes 29 and 10. Valve seat 33 is provided about port 31, the head of valve 34 normally being adapted to be held seated thereagainst by spring 35 which bears against the ported nut 36 which is threaded into the enlarged bore 36ª of the plunger. In order that the plunger may be properly machined to receive the nut and so the nut may be accessible for adjustment, the plunger portion 28 is made up of two threadably joined parts 28ª and 28ᵇ (as clearly shown in Fig. 2) with packing 37 interposed. Nut 36 serves as a guide for valve stem 38, and by adjusting the nut, the tension of spring 35 may be regulated for a purpose to be described later. Shoulder 24 is relieved at 39 and relief port 40 leads from the chamber thus formed to the atmosphere so, on the upstroke of the plunger, air may exhaust therethrough rather than be trapped with a resulting built up pressure. If desired, a flap or check valve 41 may be provided for port 40 so when the plunger passes downwardly a partial vacuum will exist in bore 22 between shoulder 24 and the plunger. This vacuum acts to assist the plunger in its subsequent upstroke.

In order that plunger 26 may be lubricated, there are provided compartments 42 for the reception of liquid or hard oil, passageways 43 leading to bore 23, and plugs 44 providing removable closures for the compartments.

A plug 45 is threaded into the bore of the plunger and has air passageways 45ª to allow communication between the interior of tube 29 and bore 32. The upper end 46 of flexible cable 47 is secured to plug 45 in any suitable manner, for instance, by leading it within taper bore 46ª. Cable 47 leads to a rigid or semi-rigid head 48 which is of such size that air pressure exerted against it from within the tire normally serves to hold plunger 26 down (against the upward lift exerted by the same air against the bottom of the plunger); a path 49, within which the head may be vulcanized, being cemented or vulcanized to tube 10 to hold the head properly positioned beneath pump 13 and to exclude air from beneath the head.

A comparatively weak spring 50 may be interposed between plunger 26 and nut 31ª, being only of sufficient strength to support the weight of the plunger so the internal parts of the pump may be held in operative assembly even though the inner tube goes flat and thereby relieves the air pressure beneath the plunger.

At the upper end of bore 23 is a restricted port 51 about which is valve seat 52. The head of valve 53 is normally held seated against 52 by spring 54 which encircles valve stem 55 between collar 56 and barrel shoulder 57. A cap 58 is threaded on pump stem 59 and is apertured at 60 to admit air to inlet valve 53. Screening 61 or other suitable filtering means may be interposed between apertures 60 and valve 53 to prevent the admission of dust and dirt to the working parts of the pump.

Should it be desired to release some of the air within tube 10 or to take a gage reading of the tire pressure, cap 58 is removed and valve 53 is depressed until lug 62 on the valve head contacts with and depresses lug 63 on valve 34 to open the latter valve, whereupon air passes upwardly through tube 29, ports 36ᵇ, bore 32, port 31, bore 23, port 51 and thence to the atmosphere or to the gage.

We will first describe the operation of our device when it is desired that it act automatically to pump air into the tire when the tire pressure drops below a predetermined amount, and cease to act when predetermined pressure is restored.

Assume first that the tire pressure is of said predetermined amount or "normal." There will be a certain normal amount of tire deflection due to the weight of the vehicle and each time that portion of the tire immediately beneath head 48 contacts with the ground, said head will approach pump 13 by an amount equal to the normal tire deflection. Consequently, plunger 26 is momentarily unrestrained by cable 47 and will be forced upwardly by the air pressure in tube 10, due to the differential in effective areas of the upper and lower plunger end. In its movement, piston 27 compresses the air within chamber C. Now pressure chamber C is of such capacity, and valve spring 35 is so adjusted that, with a piston stroke of predetermined length and initiated at a given point in bore 23, the pressure built up in the chamber is incapable of unseating valve 34 as long as the tire pressure (acting to resist valve opening movement) is normal or greater than normal. Therefore, even though the vehicle be overloaded so the tire deflection is above normal and allows the plunger to be moved to its upper limit, the air compressed within chamber C cannot enter the tire. When the tire revolves to carry head 48 from above the point of ground contact, the air within the tire acts against head 48 (since it presents greater surface area to the confined air than does the lower end of plunger 26) to draw plunger 26 back to the position of Fig. 1, the pressure of the air within chamber C returning to normal as piston 27 withdraws. The various parts are preferably so proportioned that when the tire is under normal load and pressure and is therefore normally deflected, the plunger will not ordinarily rise high enough to engage shoulder 24, and therefore it is assured the air within chamber C is put under less compression than that necessary to open valve 34.

If the tire pressure be below normal, the tire deflection will be greater than normal, and the stroke of piston 27 will be sufficiently long to build up enough pressure within chamber C to unseat valve 34 against the combined action of spring 35 and the pressure of the tire. Air from chamber C is thus put into tube 10. This action will occur even though plunger 26 does not stroke to its upper limit, for it starts to occur the instant the pressure built up within chamber C exceeds the tire pressure plus the pressure necessary to compress spring 35. It will be evident that by adjusting spring 35 through the medium of nut 36, valve 34 may be adjusted to open at any predetermined degree of differential in the tire pressure and the built up pressure in compartment C, so with the pump having given piston movement within a bore 23 of given diameter and effective length, the pump may be adjusted to deliver air to the tire the instant the tire pressure drops below any predetermined amount, within reasonable limits. Or, with the valve spring set, by varying the length of cable 47 to vary the spacing between shoulder 24 and the top of plunger part 28 when in the full retracted position of Fig. 1, the pump may be adjusted so the piston builds up the requisite pressure within chamber C to open valve 34 and deliver air to the tire against varying amounts of tire pressure.

When the tire revolves sufficiently to allow the air pressure exerted against head 48 to retract cable 47, plunger 26 is drawn downwardly (valve 34, of course, being closed during this movement) valve 53 opening against the action of spring 54 to admit a replenishing supply of air to chamber C. Valve 53 closes instantly when piston 27 comes to rest.

Now in certain situations it is desirable that the tire pressure be increased over normal when the equipped vehicle is under abnormally heavy load. In other words, it is desired that the tire deflection (rather than tire pressure) remain normal even though the vehicle load be abnormally heavy. To do this it is necessary that the tire pressure be increased over normal. In such a case cable 47 is taken up or shortened so the top of plunger part 28 does not contact with shoulder 24 until the tire deflects an appreciably greater amount than the deflection caused by a normal vehicle load with the tire under normal pressure. In other words, the pump is now capable of delivering air to the tire even though the tire pressure is at or above normal, if the tire deflection is great enough to allow the piston to travel upwardly beyond its normal upstroke. When under normal vehicle load, should the tire pressure fall below normal, the pump piston travels sufficiently to build up ample pressure in compartment C to open valve 34 and deliver air to the tire, but once the tire pressure again reaches normal the stroke of the piston becomes too short and occurs too far from the head of valve 53 to raise valve-opening pressure in chamber C. However, if the vehicle is overloaded, the tire deflects to a greater extent than is normal, allowing a longer stroke to piston 27 which thereupon builds up sufficient pressure in chamber C to open valve 34 against the normal tire pressure. Therefore, the pressure of air in the tire is raised above normal and will increase until the tire deflection is normal, whereupon the piston stroke is shortened to such an extent that the built up pressure in chamber C is no longer competent to open valve 53, and the pump idles. When the vehicle load is lightened to normal, air may be released from the tire by depressing valve stem 53 until lug 62 opens valve 34.

It is evident that the tire may be initially inflated by attaching an ordinary pump to the threaded stem 59.

It is believed that a full understanding of the invention will be had from the foregoing, but it is to be emphasized that the description and drawings are merely illustrative, and not restrictive of the invention. The invention is in no way limited to the specific embodiment here illustrated except in so far as the claims are limited.

Having described a preferred form of our invention, we claim:

1. In a pump of the character described, a barrel provided with a pressure chamber, a piston adapted to be reciprocated through the chamber to build up pressure therein, an inlet valve for admitting air to the chamber, a normally closed outlet valve adapted to open to allow passage of air from said chamber when the air pressure therein is of predetermined amount, and means on the two valves adapted to be brought into coaction by manual manipulation of the inlet valve to open the outlet valve.

2. In a pump of the character described, a barrel with two co-axial bores of different sizes, a trunk piston reciprocable in the two bores, the larger bore having an open end at the end of the barrel and the smaller bore having a closed end and forming a compression chamber, an extensible fluid tight member connected in fluid tight engagement at one end to the barrel at the open end of the large bore and at the other end to the larger end of the piston, the piston comprising two parts screw-threadedly connected together and each part having a longitudinal bore, a ported spring seat screw threadedly adjustable in the bore of one piston part, a valve controlling passage of fluid through the piston bores, a valve closing spring bearing on said adjustable spring seat, an inlet valve for the compression chamber, and means on the two valves adapted to be brought into coaction by manual manipulation of the inlet valve to open the other valve.

3. An automatic pump for inflating a pneumatic vehicle tire, embodying a reciprocating air pumping mechanism adapted to compress air on its stroke in one direction actuated by the air pressure in the tire to which it is applied, and a tension member connected at one end with the air pumping mechanism to pull it through its stroke in the opposite direction, said member being adapted at its other end to be connected to the tire wall and being collapsible under longitudinal compression.

4. An automatic pump for inflating a pneumatic vehicle tire, embodying a cylinder of two differential bores, a trunk piston operating in the differential bores to compress air in the smaller bore when pressure is applied to the larger end of the piston to move it, means to mount the cylinder at one side of a tire so that the air compressing movement of the piston is outward away from the tire and so that the larger end of the piston is exposed to the air pressure within the tire, and a tension member connected at one end with the piston to pull it inwardly, said member being adapted at its other end to be connected to the tire wall at the side opposite that at which the cylinder is mounted and said member being collapsible under longitudinal compression.

5. An automatic pump for inflating a pneumatic vehicle tire on its rim, embodying a reciprocating air pumping mechanism adapted to compress air on its stroke in one direction actuated by the air pressure in the tire to which it is applied, means to mount the mechanism on the tire rim and in connection with the tire so that the mechanism is exposed to the air pressure within the tire and so that its pumping stroke is in a direction away from the tire, and a tension member connected at one end with the air pumping mechanism to pull it through its stroke in the opposite direction toward the tire, said member being adapted at its other end to be connected to the tire wall at its tread portion opposite the rim and being collapsible under longitudinal compression.

6. An automatic pump for inflating a pneumatic vehicle tire on its rim, embodying an air compressing mechanism having a cylinder of differential bores, a trunk piston operating in the differential bores to compress air on its stroke in one direction, means to mount the cylinder on the tire rim and in connection with the tire so that the larger end of the piston is exposed to the air pressure within the tire to move it through its air compressing stroke, and so that the air compressing stroke of the piston is in a direction away from the tire, a tension member connected at one end with the piston to pull it through its stroke toward the tire, said member being collapsible under longitudinal compression, and a head at the other end of said member adapted to be attached to the inner surface of the tire wall at its tread portion opposite the rim, the effective area of said head exposed to air pressure within the tire being greater than the piston area exposed to said air pressure.

7. An automatic pump for inflating a pneumatic vehicle tire, embodying an air compressing mechanism including a cylinder, a piston adapted to be reciprocated therein, means to mount the cylinder in connection with the tire so that the end of the piston is exposed to the air pressure within the tire to move the piston through its air compressing stroke, a tension member connected at one end with the piston to pull it through its return stroke, said member being collapsible under longitudinal compression, and a head at the other end of said member adapted to be attached to the inner surface of the tire wall at its tread portion opposite the rim, the effective area of said head exposed to air pressure within the tire being greater than the piston area exposed to said air pressure.

8. An automatic pump for inflating a pneumatic vehicle tire, embodying an air pumping mechanism with a cylinder, a piston adapted to be reciprocated therein, a tension member connected at one end to the piston and adapted at the other end to be connected to the tire wall, said member being collapsible under longitudinal compression and adapted to pull the piston through its stroke in one direction, and means independent of the tension member whereby the piston may be moved through its stroke in the opposite direction.

9. In a pump for inflating a pneumatic vehicle tire, an open ended barrel provided with a pressure chamber, a piston adapted to be reciprocated through the chamber to build up pressure therein, means for mounting the barrel with its open end in communication with the interior of a tire, a collapsible member adapted to connect the piston to the tire wall, a fluid tight member connected in fluid tight engagement to the barrel at its open end and connected at its other end in fluid tight engagement with the piston, an inlet valve for admitting air to the pressure chamber, a normally closed outlet valve adapted to open to allow passage of air from said chamber when the air pressure therein is of predetermined amount, and means whereby the two valves are brought into co-action by manual manipulation to open the outlet valve.

In witness that we claim the foregoing we have hereunto subscribed our names this 20th day of November, 1924.

WILLIAM J. POOLE.
GROVER LAUBE.